(12) United States Patent
Weisberg

(10) Patent No.: US 8,628,814 B2
(45) Date of Patent: Jan. 14, 2014

(54) ACID-THICKENED FOOD COMPOSITIONS AND PRODUCTS

(75) Inventor: Michael D. Weisberg, Dallas, TX (US)

(73) Assignee: Dazzlepie Partners, Ltd., Dallas, TX (US)

( * ) Notice: Subject to any disclaimer, the term of this patent is extended or adjusted under 35 U.S.C. 154(b) by 1116 days.

(21) Appl. No.: 11/263,815

(22) Filed: Oct. 31, 2005

(65) Prior Publication Data

US 2006/0286254 A1  Dec. 21, 2006

Related U.S. Application Data

(60) Provisional application No. 60/688,654, filed on Jun. 8, 2005, provisional application No. 60/728,210, filed on Oct. 18, 2005.

(51) Int. Cl.
*A23L 1/05* (2006.01)
*A23G 1/06* (2006.01)

(52) U.S. Cl.
USPC ........................................... 426/573; 426/579

(58) Field of Classification Search
USPC ................... 426/573, 579, 587, 580
See application file for complete search history.

(56) References Cited

U.S. PATENT DOCUMENTS

| | | | |
|---|---|---|---|
| 3,830,947 A * | 8/1974 | Little et al. ..................... 426/582 |
| 3,996,390 A | 12/1976 | Igoe | |
| 3,996,391 A | 12/1976 | Inagami et al. | |
| 4,518,622 A | 5/1985 | Wilson et al. | |
| 5,356,655 A | 10/1994 | White et al. | |
| 2,784,099 A | 3/1997 | Block et al. | |
| 5,614,241 A | 3/1997 | Monte | |
| 5,820,903 A | 10/1998 | Fleury et al. | |
| 5,925,394 A | 7/1999 | Levinson | |
| 5,958,491 A | 9/1999 | Knueven | |
| 6,149,964 A | 11/2000 | Theuer et al. | |
| 6,183,802 B1 | 2/2001 | Silva et al. | |
| 6,261,624 B1 | 7/2001 | Hudson et al. | |
| 6,423,354 B1 | 7/2002 | Monte | |
| 6,548,098 B1 | 4/2003 | Munz-Schaerer et al. | |
| 6,579,551 B1 | 6/2003 | Theuer et al. | |
| 6,863,908 B2 | 3/2005 | Hamm et al. | |
| 6,863,909 B2 | 3/2005 | Baensch et al. | |
| 2002/0122864 A1 * | 9/2002 | Baensch et al. ................ 426/580 |
| 2003/0054079 A1 * | 3/2003 | Reaves et al. .................. 426/511 |
| 2003/0091707 A1 * | 5/2003 | Jindra et al. ................... 426/321 |

FOREIGN PATENT DOCUMENTS

| | | | |
|---|---|---|---|
| GB | 469490 | | 7/1937 |
| GB | 1 416 279 | | 12/1975 |
| JP | 58126741 A | * | 7/1983 |
| JP | 06054661 A | * | 3/1994 |
| JP | 7023708 | | 1/1995 |
| JP | 07079300 A | * | 3/1995 |
| JP | 2003-93005 | | 2/2003 |
| SU | 1482642 A | * | 5/1989 |
| WO | WO 01/93847 A2 | | 12/2001 |
| WO | PCT/US2006/021563 | | 6/2006 |

OTHER PUBLICATIONS

Milk Viscosity Chart obtained from http://www.brookfieldengineering.com/education/applications/laboratory-milk.asp, 1 page.*
Dairy Chemistry and Physics obtained from http://www.foodsci.uoguelph.ca/dairyedu/chem.html.*
Igoe, Robert S.; Hui, Y. H. (2001). Dictionary of Food Ingredients (4th Edition). (pp. 163-164). Springer—Verlag.*
Gourmetsleuth.com 2005 "How to make a Key Lime Pie," http://www.gourmetsleuth.com/recipe_keylimepie.htm.
International Search Report PCT/US2006/021563, dated Jan. 16, 2007.
Intellectual Property Office of Singapore, Written Opinion dated Jun. 30, 2009 for patent application No. 200718438-5.
Intellectual Property Office of New Zealand, Examination Report dated Sep. 23, 2009 for patent application No. 564564.
Australian Examiner's Report for appl. 2006255237, mailed Nov. 30, 2010, 2 pgs.
Food.com, "2 Minute Mayonnaise", retrieved from www.food.com/recipeprint.do?rid=100051, Feb. 3, 2011.
Supplementary European Search Report in Appl. No. 06772030.0, dated Sep. 9, 2011, 4 pages.
European Office Action in Appl. No. 06772030.0, dated Nov. 22, 2011; 10 pages.

* cited by examiner

*Primary Examiner* — Jyoti Chawla
(74) *Attorney, Agent, or Firm* — Squire Sanders (US) LLP

(57) ABSTRACT

The present invention provides food compositions comprising thickened dairy protein and flavorings lacking sufficient acidity for protein thickening, food products comprising the compositions and methods of making the compositions.

38 Claims, No Drawings

ACID-THICKENED FOOD COMPOSITIONS AND PRODUCTS

The instant application claims the benefit under 35 U.S.C. §119 of U.S. Provisional Application No. 60/688,654, filed Jun. 8, 2005, and U.S. Provisional Application No. 60/728,210, filed Oct. 18, 2005, the contents of each of which are hereby incorporated by reference in their entirety.

1. FIELD OF THE INVENTION

The present invention provides food compositions comprising thickened dairy protein and flavorings lacking sufficient acidity for thickening the dairy protein, food products comprising the compositions and methods of making the compositions.

2. BACKGROUND OF THE INVENTION

Pies and similar desserts have delighted consumers for generations. Notable pies are prized for their flavor and texture. The texture of many pies is provided by thickened fillings. Such fillings can be thickened in a number of ways, for instance with starch, gelatin or protein thickening. Famous among pies is the key lime. Few food compositions can match the flavor and consistency of a key lime pie. Those of skill in the art will recognize that the remarkable texture of a key lime pie is due to the thickening of milk and egg proteins by the action of the lime juice. In fact, lime juice can thicken a key lime pie with no baking or refrigeration at all.

Unfortunately, few food substances have the texture of a key lime pie with other flavors. Similar food substances can be made with lemon juice and have a resulting lemon flavor. Attempts to prepare a thickened food composition with flavors other than lemon or lime often result in unmanageable liquid composition.

3. SUMMARY OF THE INVENTION

Remarkably, the present invention provides food compositions that remove flavor limitations from the thickened protein pie, expanding its range of flavors far beyond lime and lemon. Indeed, the present invention provides food compositions that have the thickened dairy protein of a key lime pie in combination with any flavor imaginable to the person of skill in the art, especially flavors other than lime or lemon.

While not intending to be bound by any particular theory of operation, the present invention is based, in part, on the use of particular edible acids that can thicken dairy protein to the consistency expected for a key lime pie without interfering with the flavor of the food composition. Accordingly, the present invention provides food compositions comprising thickened dairy protein and any flavoring other than lemon or lime.

In one aspect, the present invention provides food compositions comprising dairy protein and flavoring other than lemon or lime. The dairy protein can be from any source of dairy protein known to those of skill. Optionally, the food composition can comprise a sweetener. This sweetener can be any sweetener known to those of skill, and is preferably in an amount sufficient to maintain the thickness and consistency of the dairy protein. In preferred embodiments, the dairy protein and the sugar are in the form of sweetened condensed milk. The food composition can optionally comprise egg in any form, for instance egg yolk, egg white or both.

The dairy protein can be thickened by any manner apparent to those of skill in the art to thicken the dairy protein other than with lemon juice or with lime juice. In preferred embodiments, the dairy protein is thickened by adding one or more edible acids in an amount sufficient to thicken the dairy protein. The edible acid can be any edible acid known to those of skill in the art. In certain embodiments, the edible acids are selected from the group consisting of ascorbic acid, citric acid, malic acid, tartaric acid, fumaric acid and adipic acid. In an advantageous embodiment, the present invention provides food compositions comprising both ascorbic acid and tartaric acid. In another advantageous embodiment, the present invention provides food compositions comprising citric acid, malic acid and tartaric acid.

By avoiding traditional thickening agents such as starches or gels for thickening, it is believed that certain food compositions of the invention achieve a cleaner, brighter flavor when compared to the traditional starchy or gummy thickened food compositions, and that their longer, richer aftertaste provides additional satisfaction. Accordingly, in certain embodiments, the present invention provides food compositions comprising thickened dairy protein and substantially no starch or gel. Of course, in some embodiments, food compositions thickened according to the invention can further comprise some amount of starch or gel so long as they are thickened according to the methods described herein. Accordingly, in further embodiments, the present invention provides food compositions comprising a starch or a gel, or both, a dairy protein and a sufficient amount of one or more edible acids to thicken the dairy protein.

In further aspects, the present invention provides food products comprising a food composition of the invention. The food product can be any food product apparent to those of skill in the art that can be made from a food composition comprising thickened dairy protein according to the invention. In certain embodiments, the present invention provides food products including, but not limited to, pies, custards and puddings. In further embodiments, the present invention provides functional foods, or foodaceuticals, that comprise food compositions of the invention. As used herein, "functional foods," or "foodaceuticals," include food products comprising unusually high amounts of added nutrients, for instance ascorbic acid.

In another aspect, the present invention provides processes for making the food compositions of the invention. In general, the processes comprise contacting a dairy protein with an amount of one or more edible acids sufficient to thicken the dairy protein. In certain embodiments, the composition can be heated to set the dairy protein and to minimize potential food contaminants. In certain embodiments, the composition can be cooled to thicken the dairy protein.

Advantageously, when the food composition is thickened with an acid according to the invention, the acidic pH can slow the absorption of carbohydrates in the food composition when consumed. The slower absorption can yield a lower glycemic index for certain food compositions of the invention.

Further, when the thickening agent comprises ascorbic acid, the resulting food composition can be enriched in vitamin C for nutritional value. Certain food compositions of the invention can comprise up to 500 mg vitamin C per serving. Other food compositions of the invention can comprise up to 1000 mg or more vitamin C per serving.

4. DETAILED DESCRIPTION OF THE INVENTION

4.1 Definitions

Unless specified otherwise, terms used herein have their ordinary meaning as known to those of skill in the art.

"Thickened" in the context of the invention, refers to a composition comprising a protein that has been thickened or coagulated to form a solid or semi-solid composition. Certain solid or semi-solid compositions of the invention will be recognized by those of skill in the art to have the consistency of key lime pie filling in particular embodiments. In other embodiments, the consistency can be manipulated to fit other desired textures. In certain embodiments, a thickened food composition can be cut with a knife and eaten with a fork. In general, any food composition that is no longer liquid at refrigerator or room temperature can be a thickened food composition. A food composition comprising a dairy protein that is solid, i.e. frozen, at freezer temperature and liquid at refrigerator temperature is not thickened according to the present invention.

"Edible acid" refers to an acid recognized by those of skill in the art to be useful in a food product. Preferably, the edible acid is strong enough to reduce the pH of a food composition of the invention. In certain embodiments, the edible acid is generally recognized as safe by a regulatory agency such as the U.S. Food and Drug agency. In particular embodiments, the edible acid is selected from the group consisting of acetic acid, adipic acid, ascorbic acid, citric acid, glucono delta lactone, fumaric acid, lactic acid, malic acid, phosphoric acid, an acid phosphate, succinic acid, tartaric acid and potassium acid tartrate.

4.2 Embodiments of the Invention

The present invention provides thickened food compositions that comprise a dairy protein and, remarkably, a flavoring other than lemon or lime. According to the discoveries of the present invention, food compositions can be made with thickened dairy proteins that have the consistency of key lime pie with virtually any flavor imaginable to the person of skill in the art. The present invention frees the key lime pie from all previous flavor limitations. Accordingly, the present invention provides any food composition comprising a thickened dairy protein and a flavoring other than lemon or lime, when prepared according to the description below.

In certain embodiments, the present invention provides food compositions with a combination of flavoring agent and thickening agent that yield a thickness and texture that are pleasing to the palate without compromising the flavor of the flavoring agent. In one exemplary embodiment, the present invention provides a food composition comprising thickened dairy protein and the flavoring of orange juice. Previous attempts to make a food composition with dairy protein and orange juice did not thicken sufficiently to yield a food product such as a pie. The orange flavored pie of the present invention is thickened, has a delightful texture, and at the same time a rich orange flavor.

According to the invention, the dairy protein of the food composition is thickened. A dairy protein can be "thickened" if would be recognized as thickened by one of skill in the art according to any accepted standard. In certain embodiments, the dairy protein is thickened if the food composition is no longer liquid at refrigerator or room temperature. In certain embodiments, the dairy protein is thickened if the food composition is solid or semi-solid. In certain embodiments, the food composition cannot be poured easily. In certain embodiments, the food composition can be cut with a knife and hold its shape at 40° F., as understood by those of skill in the art. In further embodiments, the food composition can be cut with a knife and hold its shape at 40° F. and can be eaten with a fork or spoon, as understood by those of skill in the art.

In certain embodiments, the food composition has a viscosity substantially greater than the viscosity of the food composition in the absence of the thickening agent of the invention. In certain embodiments, when thickened, the food composition is more viscous by at least 50%, 100%, 150%, 200%, 300%, 400%, 500% or greater, when compared to the food composition in the absence of the thickening agent of the invention. In some embodiments, the food composition has a viscosity that is greater than 1500 centipoise (cps), 2500 cps, 4000 cps, 5000 cps, 7500 cps, 10000 cps, 15000 cps, 20000 cps, 25000 cps, 30000 cps, 40000 cps, 45000 cps, 50000 cps, 60000 cps or 75000 cps. Viscosity can be measured according to techniques known to those of skill in the art.

In certain embodiments, thickness or viscosity is measured at room temperature. In further embodiments, thickness or viscosity is measured at refrigerator temperature (e.g. 35-40° F.). Additionally, thickness or viscosity is preferably measured after the composition has chilled for a time sufficient to thicken, as described in the sections below.

4.2.1 Dairy Protein

The dairy protein can be any dairy protein known to those of skill in the art. In certain embodiments, the dairy protein is in the form of milk from which some amount of water has been removed. Useful examples include evaporated milk and sweetened condensed milk.

In certain embodiments, depending on the dairy protein, the food composition comprises a sugar in addition to the dairy protein. While not intending to be bound by any particular theory of operation, it is believed that a sugar helps provide the texture and thickness of certain food compositions of the invention. In addition, a sugar can provide, of course, sweet taste to certain food compositions of the invention.

In certain embodiments, the dairy protein is sweetened condensed milk. The sweetened condensed milk can be any sweetened condensed milk known to those of skill in the art or their equivalents. For instance, the sweetened condensed milk can be any milk from which about 60% of the water content has been removed and to which sugar has been added to a final amount of about 40-45% or more by weight. The milk can be whole fat, low fat or skim. Sweetened condensed milk can be prepared or obtained according to any method known to those of skill in the art. In particular embodiments, it is obtained from a commercial supplier, e.g. Eagle, Meadow Gold, Carnation, Nestle, Casa Solano, or others known to those of skill in the art. Food compositions comprising sweetened condensed milk are preferred.

Useful substitutes for sweetened condensed milk include compositions rich in dairy protein and sugar that are known to those of skill in the art. Examples include any form of milk from which moisture content has been removed. Further examples include any form of milk from which moisture content has been removed and to which sugar has been added.

In certain embodiments, the dairy protein is evaporated milk or filled milk. The evaporated milk can be any evaporated milk known to those of skill in the art. For instance, in certain embodiments, the evaporated milk can be a milk product from which water content has been removed. Evaporated milk can be prepared or obtained by any method apparent to those of skill in the art. The evaporated milk can be whole fat, low fat or skim evaporated milk. In particular embodiments, evaporated milk is obtained from a commercial supplier, e.g. Carnation, Borden, Nestle, Albertson's or others known to those of skill in the art. In preferred embodiments, the evaporated milk is combined with a sweetener, as described herein.

In certain embodiments, the food compositions of the invention further comprise egg. Preferably, the egg is in addition to the milk product described above. The egg can be in any form known to those of skill in the art to be useful for making a food composition of the invention. For instance, in certain embodiments, the egg is in the form of egg yolk. In further embodiments, the egg is in the form of egg white. The egg white can be beaten or whipped or prepared in any other manner apparent to those of skill in the art that will not interfere with the preparation of the food composition. In still further embodiments, the egg is in the form of egg yolk and egg white.

The egg can be present in any amount desired by the practitioner of skill in the art. In certain embodiments, the food composition comprises the yolks of three to five large eggs per kilogram food composition. In certain embodiments, the food composition comprises the yolks of three large eggs per kilogram food composition. In certain embodiments, the food composition comprises the yolks of four large eggs per kilogram food composition. In certain embodiments, the food composition comprises the yolks of five large eggs per kilogram food composition.

In further embodiments, the food composition comprises the whites of one or more large eggs per kilogram food composition. In certain embodiments, the food composition comprises the whites of one to six large eggs per kilogram food composition. In preferred embodiments, the egg whites are beaten or whipped. In further embodiments, the food composition comprises both yolks and whites in various proportions.

In further embodiments, the food composition of the invention comprises no egg. It has been found that the food composition of the invention can be thickened with or without egg. Accordingly, a food composition of the invention can comprise egg where desired for taste or texture, or a food composition of the invention can comprise no egg.

4.2.2 Optional Sweetener

In certain embodiments, the food composition of the invention comprises a sweetener. When the dairy protein is in the form of evaporated milk, a sweetener is preferred. When the dairy protein is in the form of sweetened condensed milk, no additional sweetener is necessary due to the sugar content of the sweetened condensed milk. However, should one of skill in the art desire additional sweetener, in certain embodiments, the present invention provides food compositions comprising sweetened condensed milk and an additional sweetener, including sweetened flavorings such as fruit nectars.

The sweetener can be any sweetener deemed useful by those of skill in the art. In particular embodiments, the sweetener is a monosaccharide, disaccharide or polysaccharide sweetener known to those of skill in the art. Preferred sweeteners include, but are not limited to, sugar, brown sugar, powdered sugar, honey, molasses and corn syrup. It has been found that such sweeteners can improve the texture of the food compositions of the invention. However, it has been found that a sweetener is not necessary to thicken the food compositions of the invention. Accordingly, in certain embodiments, a food composition of the invention can comprise no sweetener. In further embodiments, a food composition of the invention can comprise an artificial sweetener such as aspartame, sucralose or saccharine.

4.2.3 Thickening Agents

The food compositions of the invention can comprise any thickening agent known to those of skill in the art. The thickening agent should be capable of thickening, or increasing the thickening, of the food composition of the invention.

In certain embodiments, the thickening agent is one or more edible acids. In certain embodiments, an edible acid thickens, or contributes to the thickening of, the dairy protein of the food composition. In addition, in certain embodiments, the edible acid can provide a clean taste or smooth texture to the food composition of the invention.

The edible acid can be any acid known to those of skill in the art to be edible and further to be useful for controlling the pH of the food composition of the invention. In preferred embodiments, the edible acid is generally regarded as safe by a regulatory agency such as the U.S. Food and Drug Administration. The edible acid can be considered safe now or at a time after the filing of the instant application. In certain embodiments, the edible acid of the invention is selected from the group consisting of acetic acid, adipic acid, ascorbic acid, citric acid, glucono delta lactone, fumaric acid, lactic acid, malic acid, phosphoric acid, an acid phosphate, succinic acid, tartaric acid and potassium acid tartrate. In preferred embodiments, the edible acid is selected from the group consisting of adipic acid, ascorbic acid, citric acid, fumaric acid, malic acid and tartaric acid. These preferred acids yield food compositions with especially pleasing taste.

When the edible acid comprises ascorbic acid, the food compositions of the invention can advantageously provide nutritional benefit. Accordingly, in certain embodiments, the present invention provides food compositions comprising a thickened dairy protein that are enriched in ascorbic acid.

In certain embodiments, the present invention provides compositions comprising a combination of edible acids. In a particular embodiment, the present invention provides food compositions that comprise ascorbic acid and tartaric acid to yield a food composition that provides clearer flavor than traditional thickeners while increasing the vitamin content of the food product. Further combinations of edible acid or acids with flavorings are described in the examples below and will be apparent to those of skill in the art.

In certain embodiments, further acids regarded as safe in foods in small amounts can be used to modulate the pH of the food. Such acids include, but are not limited to, benzoic, hydrochloric and sulfuric acids. Further acidulants will be apparent to those of skill in the art.

In certain embodiments, the edible acid or edible acids are present in the food composition of the invention in an amount sufficient to thicken the food composition. The particular amount will depend on the overall amount of the food composition, its liquid content, the dairy protein, and the properties of the edible acid (e.g. its pKa).

In certain embodiments, the edible acid or acids are present in a total amount sufficient to thicken the dairy protein of the composition. Such an amount will be apparent to those of skill in the art in light of the teaching of the instant specification. In certain embodiments, the edible acid or acids are present in a total amount sufficient to yield a food composition pH of less than 5.0. In further embodiments, the edible acid or acids are present in a total amount sufficient to yield a food composition pH of less than 4.9. In further embodiments, the edible acid or acids are present in a total amount sufficient to yield a food composition pH of less than 4.8. In further embodiments, the edible acid or acids are present in a total amount sufficient to yield a food composition pH of less than 4.7. In further embodiments, the edible acid or acids are present in a total amount sufficient to yield a food composition pH of less than 4.6. In further embodiments, the edible acid or acids are present in a total amount sufficient to yield a food composition pH of less than 4.5. In further embodiments, the edible acid or acids are present in a total amount sufficient to yield a food composition pH of less than 4.4. In further embodiments, the edible acid or acids are present in a total amount sufficient to yield a food composition pH of less than 4.3. In further embodiments, the edible acid or acids are present in a total amount sufficient to yield a food composition pH of less than 4.2. In further embodiments, the edible acid or acids are present in a total amount sufficient to yield a food composition pH of less than 4.1. In further embodiments, the edible acid or acids are present in a total amount sufficient to yield a food composition pH of less than 4.0.

In certain embodiments, the edible acid or acids are present in a total amount sufficient to yield a food composition pH of from about 3.0 to about 5.0. In further embodiments, the edible acid or acids are present in a total amount sufficient to yield a food composition pH of from about 3.2 to about 4.9. In further embodiments, the edible acid or acids are present in a total amount sufficient to yield a food composition pH of from about 3.2 to about 4.8. In further embodiments, the edible acid or acids are present in a total amount sufficient to yield a food composition pH of from about 3.2 to about 4.7. In further embodiments, the edible acid or acids are present in a total amount sufficient to yield a food composition pH of from about 3.2 to about 4.6. In further embodiments, the edible acid or acids are present in a total amount sufficient to yield a food composition pH of from about 3.2 to about 3.9. In further embodiments, the edible acid or acids are present in a total amount sufficient to yield a food composition pH of from about 3.2 to about 3.4.

In certain embodiments, the edible acid or acids are present in a total amount sufficient to yield a food composition pH of about 3.2. In certain embodiments, the edible acid or acids are present in a total amount sufficient to yield a food composition pH of about 3.4. In certain embodiments, the edible acid or acids are present in a total amount sufficient to yield a food composition pH of about 3.9. In certain embodiments, the edible acid or acids are present in a total amount sufficient to yield a food composition pH of about 4.5. In certain embodiments, the edible acid or acids are present in a total amount sufficient to yield a food composition pH of about 4.7. In certain embodiments, the edible acid or acids are present in a total amount sufficient to yield a food composition pH of about 4.8 or about 4.9.

In certain embodiments, the food composition of the invention comprises from about 2 g to about 10 g total edible acids per kilogram. In further embodiments, the food composition of the invention comprises from about 2 g to about 8 g total edible acids per kilogram. In further embodiments, the food composition of the invention comprises from about 4 g to about 8 g total edible acids per kilogram. In further embodiments, the food composition of the invention comprises from about 6 g to about 8 g total edible acids per kilogram. In further embodiments, the food composition of the invention comprises about 2 g total edible acids per kilogram. In further embodiments, the food composition of the invention comprises about 4 g total edible acids per kilogram. In further embodiments, the food composition of the invention comprises about 6 g total edible acids per kilogram. In further embodiments, the food composition of the invention comprises about 8 g total edible acids per kilogram. In further embodiments, the food composition of the invention comprises about 10 g total edible acids per kilogram.

In particular embodiments, the food composition of the invention comprises as edible acids ascorbic acid and tartaric acid. In certain embodiments, the food composition of the invention comprises about 2 g ascorbic acid and about 2 g tartaric acid per kilogram. In certain embodiments, the food composition of the invention comprises about 3 g ascorbic acid and about 3 g tartaric acid per kilogram. In further embodiments, the food composition of the invention comprises about 4 g ascorbic acid and about 4 g tartaric acid per kilogram. In certain embodiments, the food composition of the invention comprises about 5 g ascorbic acid and about 5 g tartaric acid per kilogram. Of course, the present invention provides food compositions comprising either ascorbic acid alone or tartaric acid as the edible acid alone, or in any combination. Food compositions comprising ascorbic acid and tartaric acid can advantageously present the characteristics of each acid,.

In further embodiments, acids such as malic acid, citric acid, fumaric acid and adipic acid, as well as many other acids, can be used either singly or in combinations according to their characteristics recognized by those of skill in the art.

In particular embodiments, the food composition of the invention comprises as edible acids malic acid, ascorbic acid and tartaric acid. In certain embodiments, the food composition of the invention comprises about 1 g malic acid, about 1 g ascorbic acid and about 1 g tartaric acid per kilogram. In certain embodiments, the food composition of the invention comprises about 2 g malic acid, about 2 g ascorbic acid and about 2 g tartaric acid per kilogram. In certain embodiments, the food composition of the invention comprises about 2.67 g malic acid, about 2.67 g ascorbic acid and about 2.67 g tartaric acid per kilogram. In certain embodiments, the food composition of the invention comprises about 3 g malic acid, about 3 g ascorbic acid and about 3 g tartaric acid per kilogram.

In particular embodiments, the food composition of the invention comprises as edible acids malic acid, citric acid and tartaric acid. In certain embodiments, the food composition of the invention comprises about 1 g malic acid, about 1 g citric acid and about 1 g tartaric acid per kilogram. In certain embodiments, the food composition of the invention comprises about 2 g malic acid, about 2 g citric acid and about 2 g tartaric acid per kilogram. In certain embodiments, the food composition of the invention comprises about 2.67 g malic acid, about 2.67 g citric acid and about 2.67 g tartaric acid per kilogram. In certain embodiments, the food composition of the invention comprises about 3 g malic acid, about 3 g citric acid and about 3 g tartaric acid per kilogram.

4.2.4 Flavoring Agents

The food composition of the invention further comprises one or more flavoring agents. The flavoring agent can be any flavoring agent known to those of skill in the art other than a flavoring agent based on lime juice or lemon juice. While not intending to be bound by any particular theory of operation, it is believed that lime juice and lemon juice are sufficiently acidic to thicken the dairy protein of the food composition of the invention without the addition of a thickening agent as described above. Accordingly, in preferred embodiments of the invention, the food composition of the invention comprises no lime juice or lemon juice. In certain embodiments, the food composition of the invention comprises a flavoring that is not sufficiently acidic to thicken a dairy protein.

However, in certain embodiments, the person of skill might wish to prepare a food composition comprising a small amount of lime juice or lemon juice. For instance, such a food composition might comprise only enough lime juice or lemon juice to yield a food composition with a pH of about 5.0 or greater. Accordingly, the present invention provides food compositions comprising a small amount of lime juice or lemon juice, or both, along with a sufficient amount of an edible acid to yield a pH in a range described above, e.g. about 3.2 to about 4.9, and thus a food composition comprising a thickened dairy protein.

In further embodiments, the food composition comprises no lime juice or lemon juice. Since lime juice or lemon juice could dominate the flavor of the food composition, their absence can be advantageous.

The flavoring agent can be any flavoring agent known to those of skill in the art, other than lime juice or lemon juice. Remarkably, according to the method of the invention, the food composition can still thicken with the flavoring agents described in detail below.

In certain embodiments, the flavoring agent is selected from the group consisting of ababai, acerola, allspice, almond, amaretto, anise, apple cider, apple juice, apple pie, applesauce, apple spice, apricot, banana, berry (e.g., blackberry, dewberry, boysenberry, loganberry, raspberry, blueberry, cranberry, huckleberry, lingonberry, strawberry, elderberry, gooseberry, mulberry, etc.), black walnut, bourbon, brandy, brown sugar, bubble gum, burgundy, butter pecan, buttermilk, butter rum, butterscotch, cantaloupe, cappuccino, caramel, carbonated beverage, cardamom, carrot, cashew, casaba, cassis, champagne, Chardonnay, cheesecake, cherry, cherry cola, chocolate, chocolate ribbon, chocolate ripple, cinnamon, cinnamon sugar, citrus, clove, cocoa, coconut, coffee, coffee liqueur, cognac, cola, cotton candy, cranberry, cream, cream soda, crème brulee, currant (red, black or white), custard, custard cream, daquiri, dragonfruit, dulce de leche, durien, éclair, egg, eggnog, feijoa, fig, five spice, French vanilla, fruit punch, galangal, ginger, ginger ale, grape, grapefruit, grenadine, guanabana, guava, hazelnut, hibiscus, honey, honeydew, Irish cream, kiwi, lavender, licorice, liqueur, lychee, macadamia, mai tai, mace, mahlab, mango, mangosteen, maple, margarita, marshmallow, milk, mint (e.g. peppermint, spearmint, doublemint, wintergreen, etc.), mixed berry, mixed fruit, mojito, molasses, nectarine, nutmeg, oatmeal, orange (e.g. sweet orange, navel orange, valencia orange, mandarin orange, blood orange, scarlet navel orange, etc.), tangerine, tangelo, orange liqueur, orange mint, orange peel, orange-vanilla, orange water (orange blossom water or orange flower water), orange spice, papaya, passionfruit, peach, pear, peppermint, pina colada, pineapple, pistachio, plum, pluot, pomegranate, praline, prune, pumpkin, pumpkin pie, pumpkin spice, quince, raisin, rambutan, raspberry, rhubarb, root beer, rose, rose hip, rosemary, rose water, rum, saffron, sangria, sesame, soda, sour cream, soursop, soy, spearmint, star fruit, strawberry, strawberry-banana, strawberry-kiwi, strawberry-lime, strawberry-melon, other strawberry combinations, sugar, sumac, sweet potato, sweetsop, tamarind, tangelo, tangerine, tequila, thyme, tiramisu, toffee, triple sec, tropical fruit, tropical punch, tutti frutti, vanilla, vanilla bean, walnut, watermelon, whisky, white chocolate, wild berry, wine, yam, yerba buena and yogurt.

Any of the above flavoring agents can be used in combination with other flavoring agents described above. Particular combinations include, for example, mixed fruit (e.g., strawberry/banana, mango/pineapple, papaya/guava/orange, tutti frutti, etc.) and mixed flavors (e.g., orange/vanilla, orange spice, apple cinnamon, chocolate/raspberry, etc.).

As will be recognized by those of skill in the art, certain of the above flavoring agents can be enhanced by combination with an appropriate zest, flavoring oil or extract. For instance, any of the orange flavoring agents can be combined with orange, tangerine or tangelo zest to yield greater flavor in the food composition. Further, unrelated flavors such as vanilla, chocolate or cinnamon can be similarly used.

In certain embodiments, the flavoring agent is selected from the group consisting of apple cider, applesauce, apricot, brown sugar, cola, eggnog, fruit punch, grape, grapefruit, hibiscus, mango, margarita, mixed berry, mixed fruit, orange, orange-vanilla, passionfruit, peach, pina colada, pineapple, raspberry, strawberry, strawberry-banana, tamarind, tangelo, tangerine, tropical fruit, tropical punch and tutti frutti.

The flavoring agent can be added in any form or amount apparent to those of skill in the art. In particular embodiments, the flavoring agent is added in liquid form. The amount should be an amount sufficient to provide the desired flavor to the food composition. In certain embodiments, when the flavoring agent is a fruit juice, the food composition can comprise from about 59 ml (about ¼ cup) to about 237 ml (about 1 cup) of juice per kilogram food composition. In certain embodiments, the food composition can comprise about 59 ml (about ¼ cup), about 118 ml (about ½ cup), about 177 ml (about ¾ cup) or about 237 ml (about 1 cup) flavoring agent per kilogram food composition. In preferred embodiments, the food composition comprises about 118 ml (about ½ cup) flavoring agent per kilogram food composition. When the flavoring agent is other than a fruit juice, those of skill in the art can adjust the amount of the flavoring agent to account for the intensity of the flavoring agent in the food composition. Those of skill in the art will recognize that the amount of flavoring agent affects the amount of acid used for optimal thickening. It is within the skill of those in the art to determine the optimal amount of edible acid when adjusting the amount of flavoring agent.

In certain embodiments, the thickening agent is ascorbic acid (for instance 8 g per kilogram), and the flavoring agent is selected from the group consisting of apple cider, applesauce, apricot, brown sugar, cola, eggnog, fruit punch, grape, grapefruit, hibiscus, mango, margarita, mixed berry, mixed fruit, orange, orange-vanilla, passionfruit, peach, pina colada, pineapple, raspberry, strawberry, strawberry-banana, sugar, tamarind, tangelo, tangerine, tropical fruit, tropical punch and tutti frutti.

In certain embodiments, the thickening agent is tartaric acid (for instance 8 g per kilogram), and the flavoring agent is selected from the group consisting of apple cider, applesauce, apricot, brown sugar, cola, eggnog, fruit punch, grape, grapefruit, hibiscus, mango, margarita, mixed berry, mixed fruit, orange, orange-vanilla, passionfruit, peach, pina colada, pineapple, raspberry, strawberry, strawberry-banana, sugar, tamarind, tangelo, tangerine, tropical fruit, tropical punch and tutti frutti.

In particular embodiments, the thickening agent is a combination of ascorbic acid (for instance 4 g per kilogram) and tartaric acid (for instance 4 g per kilogram), and the flavoring agent is selected from the group consisting of apple cider, applesauce, apricot, brown sugar, cola, eggnog, fruit punch, grape, grapefruit, hibiscus, mango, margarita, mixed berry, mixed fruit, orange, orange-vanilla, passionfruit, peach, pina colada, pineapple, raspberry, strawberry, strawberry-banana, sugar, tamarind, tangelo, tangerine, tropical fruit, tropical punch and tutti frutti.

In particular embodiments, the thickening agent is a combination of malic acid (for instance 2 g per kilogram or 2.67 g per kilogram), citric acid (for instance 2 g per kilogram or 2.67 g per kilogram) and tartaric acid (for instance 2 g per kilogram or 2.67 g per kilogram), and the flavoring agent is selected from the group consisting of apple cider, applesauce, apricot, brown sugar, cola, eggnog, fruit punch, grape, grapefruit, hibiscus, mango, margarita, mixed berry, mixed fruit, orange, orange-vanilla, passionfruit, peach, pina colada, pineapple, raspberry, strawberry, strawberry-banana, sugar, tamarind, tangelo, tangerine, tropical fruit, tropical punch and tutti frutti.

The food composition of the invention can be used to make any food product known to those of skill in the art for which a thickened dairy protein composition might be useful. In certain embodiments, the present invention provides a pie comprising a food composition of the invention. In further embodiments, the present invention provides a custard comprising a food composition of the invention. In further embodiments, the present invention provides a pudding comprising a food composition of the invention.

4.3 Preparation of the Food Compositions

In further embodiments, the present invention provides processes for preparing a food composition of the invention. In general, the processes of the invention comprise the steps of contacting a dairy protein with a flavoring agent of the invention and with a thickening agent of the invention.

The ingredients can be contacted in any order without limitation. In certain embodiments, the dairy protein is contacted with the flavoring agent, and the resulting mixture is contacted with the thickening agent. In further embodiments, the dairy protein is contacted with the thickening agent, and the resulting mixture is contacted with the flavoring agent. Of course, since the dairy protein can begin to thicken on contact with the thickening agent, it is advantageous to subsequently contact the mixture with the flavoring agent as quickly as reasonably possible. In certain embodiments, the dairy protein is contacted with the thickening agent and the flavoring agent simultaneously.

Optional ingredients, such as eggs, can be added to the food composition at any time. Advantageously, such ingredients are added before the dairy protein is contacted with the thickening agent or soon after the dairy protein is contacted with the thickening agent.

The resulting food composition should thicken under any conditions used by the practitioner of skill in the art. In certain embodiments, the food composition is incubated at high temperature, e.g. 325° F., to set the composition, and to kill or minimize any dairy contaminants. In certain embodiments, the food composition is chilled at refrigerator temperature, e.g. 35-40° F., for optimal thickening. In preferred embodiments, the food composition is incubated at high temperature to thicken, cooled to room temperature, then chilled at refrigerator or freezer temperature. The composition can be chilled for any length of time needed to thicken the food composition, or longer, according to the judgment of the practitioner of skill in the art. In certain embodiments, the food composition is chilled for three hours to three days or more. In certain embodiments, the composition can be baked, frozen and served cold. In certain embodiments the composition can be refrigerated or frozen unbaked and served cold. In certain embodiments the composition can be stored frozen and cooked or reheated to be served hot, warm or at room temperature.

As will be recognized by those of skill in the art, incubation at high temperature is preferred when using ingredients with potential contaminants, for instance when using eggs or egg yolks. The incubation at high temperature, in certain embodiments and according to the judgment of the practitioner of skill, can be omitted. For instance, incubation at high temperature can be omitted when the food compositions comprise no eggs or no egg yolks. Incubation at high temperature can also be omitted when the food compositions comprise pasteurized eggs, or pasteurized egg yolks, and other ingredients with little or no risk of contamination as determined by the practitioner of skill.

The food composition can be stored under any conditions apparent to those of skill in the art. In certain embodiments, the food composition is stored at refrigerator temperatures (e.g. 35-40° F.). In further embodiments, the food composition is stored at freezer temperatures.

The food composition can be served at any temperature apparent to those of skill in the art. In certain embodiments, the food composition is served at chilled temperature. In certain embodiments, the food composition is served at room temperature. In certain embodiments, the food composition is served at heated temperature.

In preferred embodiments, the food composition is incubated at high temperature, stored at freezer or refrigerator temperature and served at chilled temperature. In further preferred embodiments, the food composition is not incubated at high temperature, but is stored at freezer or refrigerator temperature and served chilled. In other preferred embodiments, the food composition is incubated at high temperature, stored at freezer temperature and served at heated or room temperature, or served warm immediately after incubation. In other preferred embodiments, the composition is stored at freezer or refrigerator temperature, then incubated or heated before serving.

Food products, such as pies, custards and puddings, can be made by adding standard techniques to the above methods. Such standard techniques are well known to the practitioner of skill and need not be repeated here.

5. EXAMPLES 5.1 Example 1

Acid Thickened Orange Juice Pie

The instant example demonstrates the preparation of a food composition of the invention.

First, the finely grated rinds of two medium oranges were whisked with the yolks of four large eggs. Any number of yolks from three to five produces an appealing pie, with the yolk content being a matter of preference. The finely grated rinds of two oranges were added for additional flavor, though not necessary for thickening. One-half teaspoon of pure citrus oil can be substituted for the rind. Fourteen ounces of sweetened condensed milk were added and mixed. Then, four ounces of orange juice were added and mixed. Four grams of ascorbic acid and four grams of tartaric acid were added and mixed. Some thickening was observed at room temperature.

The mixture was poured into a graham cracker crust and baked for about 15 minutes at 325° F. until the center of the mixture set. Shortbread crusts, cookie crusts and chocolate crusts all make tasty variations; any type of crust can be used for the pie. The pie was then cooled to room temperature on a rack, then refrigerated. Pies can be refrigerated for up to, for example, three days or frozen for longer storage.

The resulting thickened pie with bright, clean orange flavor could be served chilled by cutting with a knife and enjoyed by eating with a fork.

5.2 Example 2

Acid Thickened Pies

The following pies were made according to the methods of Example 1, substituting the following flavoring agents and thickening agents for the orange rind, orange juice and edible acids of the example. Note that any acid or combination of acids can be used with any flavor, so these examples represent only a small part of what is possible. Furthermore, the best-tasting acid or combination of acids for any particular flavor is a matter of personal preference.

| Pie | Flavoring Agent | Thickening Agent |
|---|---|---|
| 2 | Orange | ascorbic acid |
| 3 | Tangerine | ascorbic acid |
| 4 | Tangelo | ascorbic acid |
| 5 | Orange and Vanilla | tartaric acid |
| 6 | Tangerine | ascorbic & tartaric acids |
| 7 | Tangelo | ascorbic & tartaric acids |
| 8 | Peach | citric, malic and tartaric acids |
| 9 | Pineapple | citric, malic and tartaric acids |
| 10 | Apple | malic acid |
| 11 | Grape | ascorbic & tartaric acids |
| 12 | Mango | citric, malic and tartaric acids |
| 13 | Tamarind | citric acid |
| 14 | Plum | citric, malic and tartaric acids |
| 15 | Sugar water | citric acid |

5.3 Example 16

Acid Thickened Orange and Tangerine Pie

The instant example demonstrates the preparation of a food composition of the invention.

First, the finely grated rinds of two medium oranges were whisked with the yolks of four large eggs. Fourteen ounces of sweetened condensed milk were added and mixed. One-half teaspoon of tangerine oil was added for additional flavor, though not necessary for thickening. Then, five ounces of orange juice were added and mixed. Four grams of ascorbic acid and four grams of tartaric acid were added and mixed. Some thickening was observed at room temperature.

The mixture was poured into a graham cracker crust and baked for about 15 minutes at 325° F. until the center of the mixture set. The pie was then cooled to room temperature on a rack and then refrigerated for up to three days, or transferred to the freezer for storage.

The resulting thickened pie with bright, clean orange and tangerine flavor could be served chilled by cutting with a knife and enjoyed by eating with a fork.

All publications, patents and patent applications cited in this specification are herein incorporated by reference as if each individual publication or patent application were specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A food composition consisting essentially of sweetened condensed milk, flavoring other than lemon or lime, optionally one or more eggs, optionally one or more thickening agents, and a sufficient amount of one or more edible acids to thicken the food composition to a viscosity that is greater than 5000 cps and at least 200% greater than the viscosity of said food composition in the absence of said one or more edible acids when measured at room temperature or refrigerator temperature, said food composition having a pH of from about 3.2 to about 4.7.

2. The food composition of claim 1 wherein the pH of the composition is from about 3.4 to about 4.7.

3. The food composition of claim 1 wherein the pH of the composition is from about 3.4 to about 4.6.

4. The food composition of claim 1 wherein the pH of the composition is about 4.6.

5. The food composition of claim 1 wherein said edible acid is selected from the group consisting of acetic acid, adipic acid, ascorbic acid, citric acid, glucono delta lactone, fumaric acid, lactic acid, malic acid, phosphoric acid, an acid phosphate, succinic acid, tartaric acid and potassium acid tartrate.

6. The food composition of claim 1 wherein said edible acid is selected from the group consisting of adipic acid, ascorbic acid, citric acid, fumaric acid, malic acid and tartaric acid.

7. The food composition of claim 1 wherein said edible acid is ascorbic acid.

8. The food composition of claim 1 wherein said edible acid is citric acid.

9. The food composition of claim 1 wherein said edible acid is malic acid.

10. The food composition of claim 1 wherein said edible acid is tartaric acid.

11. The food composition of claim 1 comprising ascorbic acid and tartaric acid.

12. The food composition of claim 1 comprising malic acid, citric acid and tartaric acid.

13. The food composition of claim 1 comprising from about 2 g to about 10 g edible acids per kilogram of the food composition.

14. The food composition of claim 1 comprising from about 4 g to about 8 g edible acids per kilogram of the food composition.

15. The food composition of claim 1 comprising about 2 g edible acids per kilogram of the food composition.

16. The food composition of claim 1 comprising about 4 g edible acids per kilogram of the food composition.

17. The food composition of claim 1 comprising about 6 g edible acids per kilogram of the food composition.

18. The food composition of claim 1 comprising about 8 g edible acids per kilogram of the food composition.

19. The food composition of claim 1 comprising from about 4 g ascorbic acid and about 4 g tartaric acid per kilogram of the food composition.

20. The food composition of claim 1 comprising egg.

21. The food composition of claim 20 wherein the egg is in the form of egg yolk or egg white or both egg yolk and egg white.

22. The food composition of claim 21 comprising three to five egg yolks per kilogram of the food composition.

23. The food composition of claim 21 comprising whipped egg whites.

24. The food composition of claim 1 wherein said flavoring is selected from the group consisting of allspice, almond, amaretto, apple cider, applesauce, apricot, banana, berry, blackberry, blueberry, brown sugar, butter pecan, buttermilk, cantaloupe, cherry, cinnamon, clove, cognac, daiquiri, eggnog, fruit punch, ginger, grape, grapefruit, hazelnut, hibiscus, honeydew, kiwi, mango, margarita, mixed berry, mixed fruit, mojito, nutmeg, orange, orange-vanilla, passionfruit, peach, peppermint, pina colada, pineapple, pistachio, plum, pomegranate, raspberry, rum, saffron, sangria, strawberry, strawberry-banana, sugar, tamarind, tangelo, tangerine, tequila, tropical fruit, tropical punch, tutti frutti, walnut, wine and wintergreen.

25. A pie comprising the food composition of claim 1.

26. A custard comprising the food composition of claim 1.

27. A pudding comprising the food composition of claim 1.

28. The food composition of claim 1 wherein said viscosity is at least 300% greater than the viscosity of said food composition in the absence of said one or more edible acids.

29. The food composition of claim 1 wherein said viscosity is at least 400% greater than the viscosity of said food composition in the absence of said one or more edible acids.

30. The food composition of claim 1 wherein said viscosity is at least 500% greater than the viscosity of said food composition in the absence of said one or more edible acids.

31. The food composition of claim 1 that consists essentially of said sweetened condensed milk, said flavoring other than lemon or lime, and said sufficient amount of one or more edible acids.

32. The food composition of claim 1 wherein said flavoring agent is selected from the group consisting of ababai, acerola, allspice, almond, amaretto, anise, apple cider, apple juice, apple pie, applesauce, apple spice, apricot, banana, berry, blackberry, dewberry, boysenberry, loganberry, raspberry, blueberry, cranberry, huckleberry, lingonberry, strawberry, elderberry, gooseberry, mulberry, black walnut, bourbon, brandy, brown sugar, bubble gum, burgundy, butter pecan, buttermilk, butter rum, butterscotch, cantaloupe, cappuccino, caramel, carbonated beverage, cardamom, carrot, cashew, casaba, cassis, champagne, Chardonnay, cheesecake, cherry, cherry cola, chocolate, chocolate ribbon, chocolate ripple, cinnamon, cinnamon sugar, citrus, clove, cocoa, coconut, coffee, coffee liqueur, cognac, cola, cotton candy, cranberry, cream, cream soda, creme brulee, currant, red currant, black currant, white currant, custard, custard cream, daiquiri, dragonfruit, dulce de leche, durien, eclair, egg, eggnog, feijoa, fig, five spice, French vanilla, fruit punch, galangal, ginger, ginger ale, grape, grapefruit, grenadine, guanabana, guava, hazelnut, hibiscus, honey, honeydew, Irish cream, kiwi, lavender, licorice, liqueur, lychee, macadamia, mai tai, mace, mahlab, mango, mangosteen, maple, margarita, marshmallow, milk, mint, peppermint, spearmint, doublemint, wintergreen, mixed berry, mixed fruit, mojito, molasses, nectarine, nutmeg, oatmeal, orange, sweet orange, navel orange, valencia orange, mandarin orange, blood orange, scarlet navel orange, tangerine, tangelo, orange liqueur, orange mint, orange peel, orange-vanilla, orange water, orange blossom water, orange flower water, orange spice, papaya, passionfruit, peach, pear, peppermint, pina colada, pineapple, pistachio, plum, pluot, pomegranate, praline, prune, pumpkin, pumpkin pie, pumpkin spice, quince, raisin, rambutan, raspberry, rhubarb, root beer, rose, rose hip, rosemary, rose water, rum, saffron, sangria, sesame, soda, sour cream, soursop, soy, spearmint, star fruit, strawberry, strawberry-banana, strawberry-kiwi, strawberry-lime, strawberry-melon, sugar, sumac, sweet potato, sweetsop, tamarind, tangelo, tangerine, tequila, thyme, tiramisu, toffee, triple sec, tropical fruit, tropical punch, tutti frutti, vanilla, vanilla bean, walnut, watermelon, whisky, white chocolate, wild berry, wine, yam, yerba buena and yogurt.

33. A method of making a food composition according to claim 1 comprising the step of contacting sweetened condensed milk with a flavoring other than lemon or lime and with a sufficient amount of one or more edible acids to thicken said food composition to a viscosity that is at least 200% greater than the viscosity of said food composition in the absence of said one or more edible acids, thereby yielding said food composition.

34. The method of claim 33 further comprising the step of refrigerating said food composition.

35. The method of claim 33 further comprising the step of freezing said food composition.

36. The method of claim 33 further comprising the step of incubating said food composition at about 325° F.

37. The method of claim 36 further comprising the step of refrigerating said food composition.

38. The method of claim 36 further comprising the step of freezing said food composition.

* * * * *

UNITED STATES PATENT AND TRADEMARK OFFICE
CERTIFICATE OF CORRECTION

| | | |
|---|---|---|
| PATENT NO. | : 8,628,814 B2 | Page 1 of 1 |
| APPLICATION NO. | : 11/263815 | |
| DATED | : January 14, 2014 | |
| INVENTOR(S) | : Weisberg | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,230 days.

Signed and Sealed this
First Day of December, 2015

Michelle K. Lee
*Director of the United States Patent and Trademark Office*